United States Patent [19]
Fox

[11] Patent Number: 5,157,720
[45] Date of Patent: Oct. 20, 1992

[54] DIALLER CHIP MODE SIGNAL

[75] Inventor: Ronald C. S. Fox, Randwick, Australia

[73] Assignee: Alcatel N.V., Amsterdam, Netherlands

[21] Appl. No.: 475,671

[22] Filed: Feb. 1, 1990

[30] Foreign Application Priority Data

Feb. 2, 1989 [AU] Australia .................... PJ2527

[51] Int. Cl.⁵ .......................................... H04M 1/26
[52] U.S. Cl. .................................... 379/361; 379/387; 379/352; 379/418; 379/355
[58] Field of Search ............... 379/387, 352, 360, 361, 379/418, 355

[56] References Cited

U.S. PATENT DOCUMENTS

| | | | |
|---|---|---|---|
| 3,988,549 | 10/1976 | Merlin et al. | 379/360 |
| 4,286,120 | 8/1981 | Sublette | 379/387 X |
| 4,315,108 | 2/1982 | Hoffman et al. | 379/361 |
| 4,508,938 | 4/1985 | Bench et al. | 379/361 |
| 4,571,723 | 2/1986 | Lusignan et al. | 379/361 X |
| 4,585,909 | 3/1986 | Otter et al. | 379/361 |
| 4,640,993 | 2/1987 | Whittaker | 379/395 |
| 4,675,902 | 6/1987 | Boeckmann | 379/387 X |
| 4,827,503 | 5/1989 | Takato et al. | 379/418 X |

OTHER PUBLICATIONS

Motorola Telecommunications Device, Technical Data, pp. 2-293 through 2-309, "MC34014 Telephone Speech Network with Dialer Interface".
UMC, Technical Data, pp. 2-17 through 2-27, "UM91214/15 Series Tone/Pulse Dialer".
OKI Semiconductor, Technical Data, pp. 139-148, "MSM6052 CMOS 4Bit Single Chip Low Power Microcontroller for Telephone".

Primary Examiner—James L. Dwyer
Assistant Examiner—M. Shehata
Attorney, Agent, or Firm—Christie, Parker & Hale

[57] ABSTRACT

A telephone circuit arrangement allows the use of a (high voltage) dialler chip (3) without a mode select output in a low voltage telephone. A filter (R1,C1) derives control signals from the DTMF output of the dialler chip. The control signals switch a control switch (TR1) connected to the Mode Select input (MS) of a transmission circuit (2) and the DTMF signals are applied to an input (T1) of transmission circuit (2). This enables the use of a dialler chip without a dedicated mode select output in a circuit which normally requires a dialler chip with a mode select output.

7 Claims, 1 Drawing Sheet

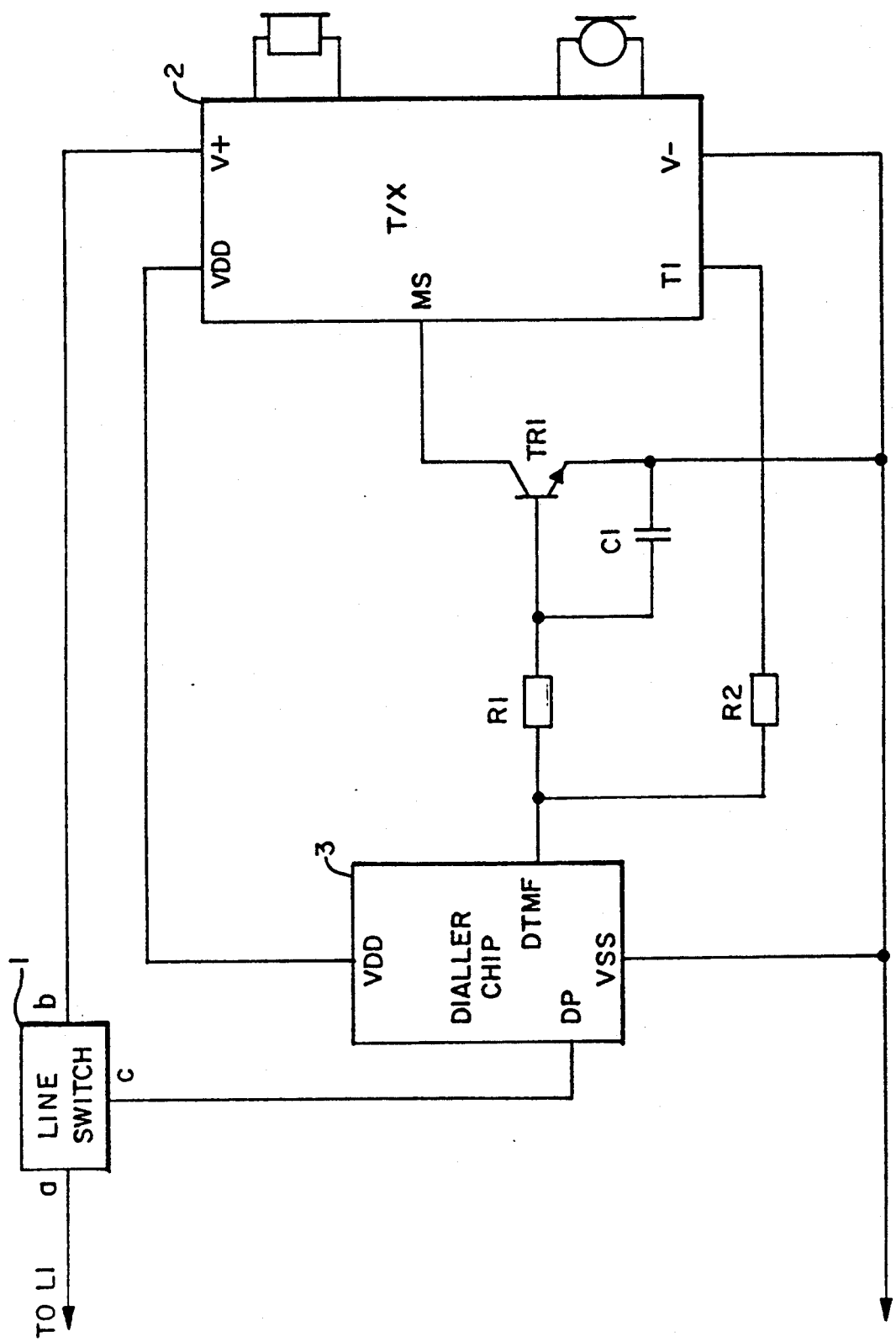

DIALLER CHIP MODE SIGNAL

TECHNICAL FIELD

This invention relates to telephone subsets and in particular to a telephone subset incorporating a dialler chip capable of providing pulse dial signals and dual tone multi-frequency (DTMF) dial signals.

BACKGROUND ART

Where low voltage subsets are normally used it is known to provide a special purpose dialler chip having a mode output signal to indicate to its associated transmission circuit the mode of operation in order to bring the transmission circuit into a tone dialling mode in which the voltage across the subsets line terminals during dialling is increased such that sufficient power is available to the dialler chip to generate dial signals.

Where high voltage subsets are normally used, the voltage across the line terminals provides sufficient power for the dialler chip to generate dial signals, and therefore a mode output signal is not required.

DISCLOSURE OF INVENTION

It is an object of the present invention to provide an arrangement whereby a mode output signal is derived from a dialler chip not provided with a mode output facility, thereby avoiding the need for a special purpose dialler chip.

According to a first aspect of the present invention there is provided in a telephone subset circuit arrangement comprising a transmission circuit means coupled to line terminal means of said subset, and a dialler circuit means associated with said transmission circuit means for generating dial signals including dial tone multifrequency signals, said dialler circuit means including a signal output terminal means from which is derived said dual tone multifrequency signals and a DC voltage component, a method of deriving a mode output signal from said dialler circuit means, comprising the steps of detecting said voltage component on said signal output means of the dialler circuit means, applying the so detected voltage component to a control element of a semiconductor switch means, and apply via a switching path of said switch means a signal to a mode select input means of said transmission circuit means to cause the transmission circuit means to transmit said multifrequency signals to line and to increase line voltage across said line input terminal means.

According to a further aspect of the invention there is provided a telephone subset circuit arrangement comprising a transmission circuit means with line input terminal means coupled to line terminal means of said subset, and a dialler circuit means associated with said transmission circuit means for generating dial signals including dual tone multifrequency signals, said dialler circuit means including a signal output terminal means from which is derived said dual tone multifrequency signals and a DC voltage component, said output terminal means being connected to signal input means of said transmission circuit means for transmission of said dual tone multifrequency signals to a line coupled to said line terminal means, wherein said arrangement further includes a controllable semiconductor switch means a control element of which is connected to said signal output means via a filter means arranged to filter said multifrequency signals and pass a substantially DC voltage component, and whose conductive path is coupled to a mode select input means of said transmission circuit means, whereby, upon generation of dual tone multifrequency signals, said semiconductor switch means switches and applies a signal to said mode select input means which causes said transmission circuit means to transmit said multifrequency signals to line and increase line voltage across the said line input terminal means.

BRIEF DESCRIPTION OF DRAWINGS

In order that the invention can be readily understood, an embodiment thereof will now be described in relation to the figure of the drawing, which is a schematic circuit of a telephone subset constructed in accordance with the invention.

BEST MODE FOR CARRYING OUT THE INVENTION

Referring to the drawing there is shown a schematic circuit of part of a telephone subset comprising a semiconductor line switch 1 whose conductive path a, b serially connects the line terminal L1 (not shown) of the subset to the V+ terminal of transmission chip (T/X) 2. Terminal V− of the transmission chip is coupled to the L2 terminal (not shown) of the telephone subset; a dialler chip 3 having a power terminal VDD coupled to terminal VDD of the transmission circuit chip 2, a common voltage rail terminal VSS coupled to L2, a dial pulse (DP) terminal coupled to the control element "C" of line switch 1 and a DTMF signal terminal DTMF coupled via resistor R2 to terminal T1 of the transmission circuit chip 2. Also coupled to terminal DTMF is an RC network comprising resistor R1 and capacitor C1 which network is coupled to the base element of a mode select switching transistor T1 whose emitter/collector junction is coupled to terminal MS (mode selection) terminal of the transmission circuit.

In operation, assuming the dialler chip is set in the DTMF mode, during tone dialling two AC signal tones superimposed on a 1 volt DC are generated in the dialler chip and derived therefrom at terminal DTMF. The tones are applied to terminal T1 of the transmission circuit 2 via resistor R2 and transmitted to line in the conventional way. At the same time the RC network comprising resistor R1 and capacitor C1 which forms a low pass filter removes the AC tones and applies a DC voltage of approximately 0.6 V to the base of mode select switching transistor TR1. Transistor TR1 is thereby rendered conducting which pulls the mode select (MS) terminal of the transmission circuit to ground via the collector/emitter junction. This condition on terminal MS places the transmission circuit in the tone dialling mode in which the subset's microphone is disconnected and the DTMF signals are coupled to the line via the microphone circuit. Moreover, the line voltage across terminals V+ and V− of transmission circuit 2 increases. This change from a low voltage condition in the speech mode to a high voltage in the dial signalling mode is desirable because in a low voltage phone, the change to high voltage during dialling provides the necessary power for DTMF generation.

While the present invention has been described with regard to many particulars it is understood that equivalents may be readily substituted without departing from the scope of the invention. The claims defining the invention are as follows:

I claim:

1. A low voltage telephone subset circuit arrangement to enable the use of a high voltage dialler chip without a mode select output in a low voltage telephone subset, the circuit arrangement comprising:
   a loop circuit including
      a semiconductor line switch having a control input and
      a transmission circuit in series with the line switch, said transmission circuit having a tone input terminal, a voltage output terminal for providing a dialler chip voltage derived from a line voltage across the transmission circuit, and a mode select input terminal responsive to a mode select signal indiciative of predetermined mode of operation for temporarily increasing said line voltage to thereby ensure that a predetermined dialler chip voltage is present at said voltage output terminal during said predetermined mode of operation,
   a high voltage dialler circuit powered by said dialler chip voltage for producing a line switch control signal on a dial pulse output terminal and dual-tone multifrequency signals on a tone output terminal but not having any mode select output, the dial pulse output terminal being connected to the control input terminal of the line switch, the dialler circuit maintaining an OFF-HOOK control signal on the dial pulse output terminal whenever it produces dual-tone multifrequency signals on its tone output terminal to thereby complete the loop circuit, the tone output terminal of the dialler circuit being connected to the tone input terminal of the transmission circuit for transmission of said dual-tone multifrequency signals over the thus-completed loop circuit, and
   a mode switch signal generating circuit connected between the dialler circuit and the transmission circuit and responsive to any dual-tone multifrequency signals present at the tone output terminal of the dialler circuit for deriving said mode signal from said dual-tone multifrequency signals and applying the thus-derived mode signal to said mode signal input terminal,
   whereby said line voltage is temporarily increased and an adequate said dialler chip voltage is maintained at said voltage output during the generation of said dual-tone multifrequency signals.

2. A telephone subset circuit arrangement as claimed in claim 1 wherein the transmission circuit is enabled to amplify the dual-tone multifrequency signals output by the high voltage dialler circuit and apply the thus-amplified signals to the loop circuit in response to the mode select signal being present at the mode select terminal.

3. A telephone subset circuit arrangement as claimed in claim 1 wherein the amplification of any signals present at said tone input is increased in response to said mode signal being applied to said mode input.

4. A telephone subset circuit arrangement as claimed in claim 1 wherein the mode switch signal generating circuit comprises a low pass filter producing a substantially DC voltage output when a dual-tone multifrequency signal is applied to the input of the mode switch signal generating circuit, the DC voltage output of the filter being applied as a switching voltage to a switching transistor coupled between the mode select input of the transmission circuit and a reference voltage.

5. A telephone subset circuit arrangement as claimed in claim 4 wherein said filter comprises an RC network.

6. A telephone subset circuit arrangement as claimed in claim 4 wherein the DC voltage output is approximately 0.6 volts.

7. A telephone subset circuit arrangement as claimed in claim 4 wherein the transmission circuit is enabled to amplify the dual-tone multifrequency signals output by the high voltage dialler circuit and apply the thus-amplified signals to the loop circuit in response to the mode select signal being present at the mode select terminal.

* * * * *